United States Patent [19]

Pomaro et al.

[11] 4,435,486

[45] Mar. 6, 1984

[54] QUICK DISCONNECT BATTERY INSTALLATION AND CHARGING SYSTEM

[76] Inventors: Nicholas T. Pomaro, 514 W. Burr Oak Dr., Arlington Heights, Ill. 60004; Russell Pomaro, 5114 Central Ave., Western Springs, Ill. 60558; Louis H. Stauffer, 2150 Cargill Dr., Northbrook, Ill. 60062

[21] Appl. No.: 384,797

[22] Filed: Jun. 4, 1982

[51] Int. Cl.³ ............................................. H01M 2/00
[52] U.S. Cl. ........................................ 429/1; 429/121; 429/176; 429/179; 429/187
[58] Field of Search ................... 429/1, 178, 179, 187, 429/176, 121

[56] References Cited

U.S. PATENT DOCUMENTS

| | | | |
|---|---|---|---|
| 1,514,056 | 11/1924 | Leitzen | 429/121 |
| 1,542,676 | 6/1925 | Drake et al. | 429/121 X |
| 1,683,529 | 9/1928 | Cohelan | 429/121 X |
| 3,881,961 | 5/1975 | Nation | 429/178 X |
| 4,226,497 | 10/1980 | Polonsky et al. | 429/1 X |
| 4,229,686 | 10/1980 | Mullersman et al. | 429/1 X |
| 4,239,841 | 12/1980 | Rorer | 429/179 |
| 4,247,603 | 1/1981 | Leffingivell et al. | 429/1 |
| 4,248,942 | 2/1981 | Eby | 429/178 X |
| 4,337,301 | 6/1982 | Rorer et al. | 429/179 |

*Primary Examiner*—Charles F. LeFevour
*Attorney, Agent, or Firm*—Emrich, Lee, Brown & Hill

[57] ABSTRACT

A system for facilitating the installation of a storage battery of the general lead acid type in a vehicle and its removal therefrom is disclosed. In one embodiment designed to accommodate side-mounted battery terminals, a rigid case mounted to the vehicle includes a pair of adjustable connectors secured to an upper portion of a lateral wall thereof. Each connector is coupled to a respective positive or negative lead of the vehicle and is adapted to securely engage a cylindrical post threadably engaged in each of the side-mounted battery terminals. The battery may be lowered into or removed from the case by means of a conventional strap positioned thereon with a tight-fitting relationship established between the case and the battery so as to insure a stable battery installation. The connectors may be manually adjusted to securely engage a respective post or to permit the easy removal of the battery from the case. The connectors are variably positioned on a lateral wall of the battery case to accommodate various battery interterminal dimensions. The invention contemplates the use of a similar case with connectors coupled to an AC charging unit for facilitating battery charging upon its removal from the vehicle. Another embodiment of the invention includes a pair of conductors each adapted at one end to engage respective adjustable connectors in the charging and battery installation cases and at the other end to engage in a conventional manner respective positive and negative post-like terminals mounted on the upper surface of a storage battery.

15 Claims, 5 Drawing Figures

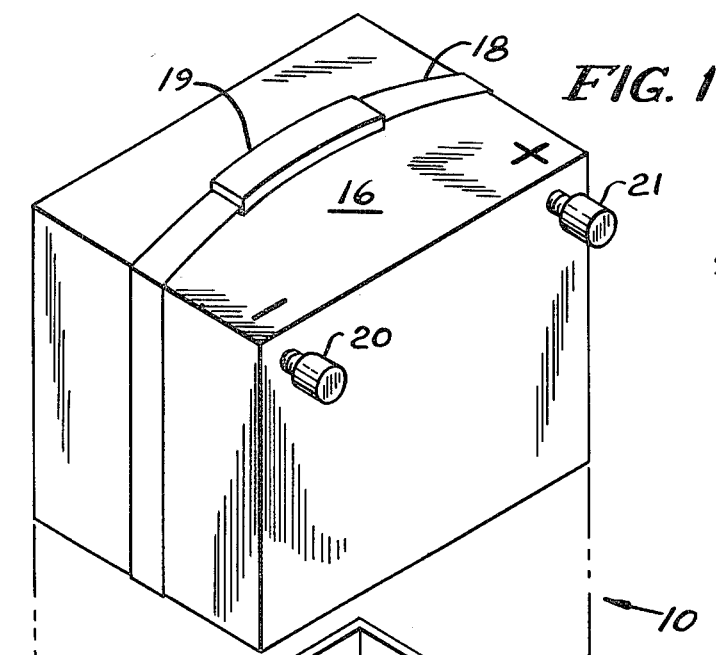
FIG. 1
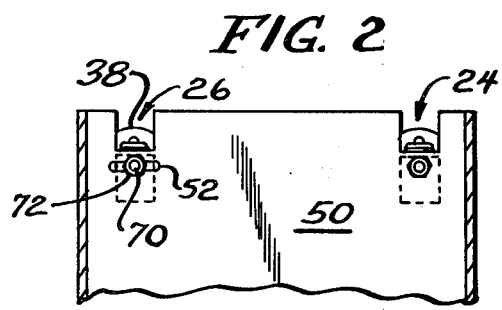
FIG. 3
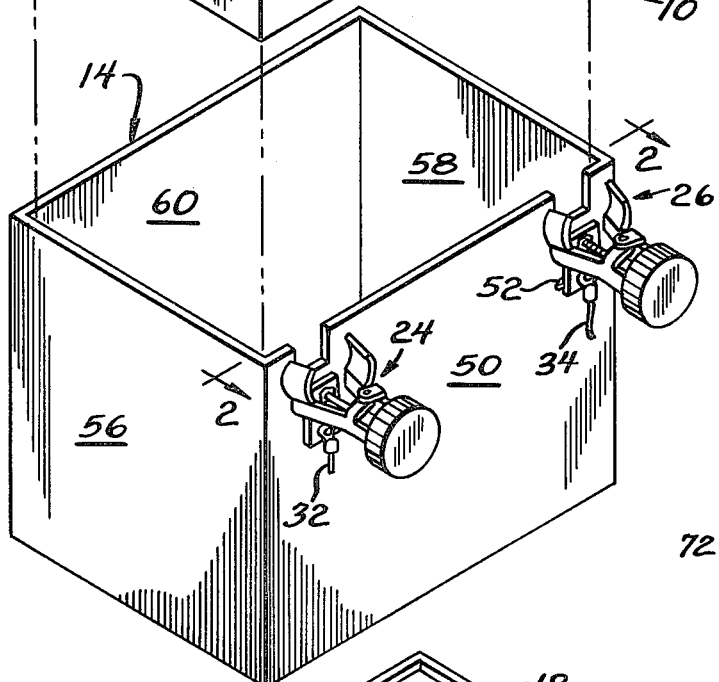
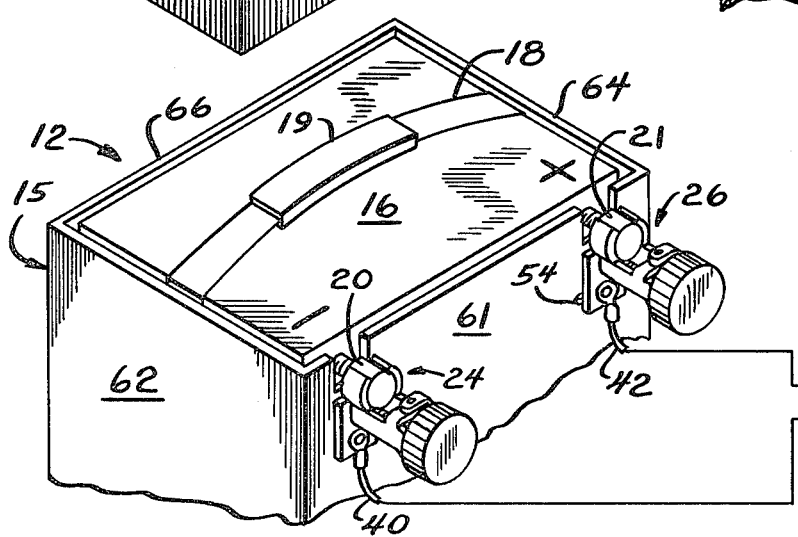
FIG. 2
FIG. 4

QUICK DISCONNECT BATTERY INSTALLATION AND CHARGING SYSTEM

BACKGROUND OF THE INVENTION

This invention generally relates to storage batteries of the general lead acid type as commonly used in a vehicle and more specifically is directed toward facilitating the installation of a storage battery in a vehicle and its removal therefrom and subsequent charging.

The typical battery installation in a vehicle, such as an automobile, involves two clamp-like structures electrically coupled to the respective positive and negative leads of the vehicle and adapted to securely engage respective cylindrical terminals mounted in the upper surface of the battery. These electrical connectors generally include a nut and bolt combination for securing the connector to the battery terminal in establishing electrical connection therebetween. This arrangement is not conducive to the easy installation and removal of the battery for a number of reasons such as the difficulty in tightening and loosening the connecting bolt which is positioned in close proximity to the upper surface of the battery, corrosion in the form of acidic deposits on the battery terminals and connectors, and the relative softness of the conductive metals used therein which frequently results in the stripping of either the nut or bolt, or both.

Storage batteries in which the terminals are in the form of threaded recesses on a lateral portion of the battery are being produced and utilized in ever increasing numbers. This installation generally includes a pair of circular conductors, each coupled to a respective electrical lead of the vehicle and through which a threaded bolt is inserted. By threadably engaging the bolts in respective terminal recesses of the battery, electrical contact is established between the terminals of the battery and the respective leads of the vehicle. While corrosion is less of a problem in this latter type of battery terminal installation, this approach is no less difficult in terms of battery installation in and removal from the vehicle. Examples of quick disconnect battery installations for side-mounted battery terminals can be found in U.S. Pat. Nos. 1,514,056 to Leitzen, 1,542,676 to Drake et al, and 1,683,529 to Cohelan.

The easy installation and removal of a storage battery in a vehicle has obvious advantages. For example, the easy removal of a fully discharged battery for replacement or re-charging, or to temporarily use a fully charged battery in another vehicle, is highly desirable. A more frequent use of a quick connect/disconnect capability for a storage battery in a vehicle would more likely involve the frequent, temporary removal of the battery for periodic charging of the battery or for merely storing the battery at room temperature. This capability is not only highly desirable but sometimes absolutely essential in low temperature climates which impose excessive demands on a conventional storage battery.

The capability to temporarily remove, such as for an overnight period, a storage battery from a vehicle exposed to extremely low outside temperatures, would not only prolong battery life, but would also better maintain battery charge for subsequent vehicle operation. For even more reliable battery starting, it would be desirable to charge the battery when removed from the vehicle and store it at room temperature. Charging the battery at a higher temperature would result in more rapid and complete battery charging requiring less electrical energy for the charging cycle. Thus, less energy would be used for maintaining the battery in a fully charged state. However, charging a battery by means of a conventional. AC rectifier/regulator frequently results in the generation of sparks creating a hazard to the person making the connections and to the battery surroundings. Finally, aside from maintaining the battery in a charged state, the easy installation in and removal of a battery from a vehicle may be highly desirable for preventing not only battery theft, but also theft of the vehicle itself.

The present invention is intended to overcome the aforementioned limitations of current storage battery vehicle installations. This is accomplished for both a side-mounted terminal battery as well as for a battery in which the terminals are mounted on the top surface thereof by means of quick connect/disconnect electrical contacts firmly coupled to a battery mounting case integrally mounted to the vehicle.

OBJECTS AND SUMMARY OF THE INVENTION

Accordingly, it is an object of the present invention to provide an improved means for mounting a conventional storage battery in a vehicle.

Another object of the present invention is to facilitate the installation and removal of a conventional storage battery in a vehicle such as an automobile.

Still another object of the present invention is to provide a battery installation and charging system for maintaining the battery in a more fully charged state.

A further object of the present invention is to provide for expeditiously changing a battery when desired without the aid of wrenches, screwdrivers or hammers.

A further object of the present invention is to extend the useful life of a conventional storage battery subjected to extreme environmental conditions.

A yet further object of the present invention is to provide theft protection for a storage battery and for the vehicle in which the storage battery is utilized.

The present invention contemplates the use of an open battery receptacle case for receiving and maintaining stably therein a conventional storage battery. The battery case is rigidly mounted to a vehicle and includes a pair of adjustable connectors coupled to respective electrical leads of the vehicle and adpated to receive a conducting element threadably engaged in each of the side-mounted terminals of the storage battery for establishing electrical connection therebetween. A strap or other conventional support means is positioned on the battery to facilitate its positioning in or removal from the battery case while electrical connection integrity is maintained by the secure engagement of the battery terminal extensions by the case-mounted connectors. The case-mounted connectors are positioned on an upper portion of a lateral surface of the case and provision is made for varying the separation between the two connectors to accommodate various batery inter-terminal distances.

A second embodiment of the invention involves the use of two short conductors having one end adapted to engage the adjustable, side-mounted connectors in the battery case and the other end adapted to securely engage a respective top-mounted battery terminal in a conventional manner. Thus, storage batteries having either side- or top-mounted terminals are contemplated for use with the present invention.

Also employed in the present invention is a second case, similarly fitted with adjustable side-mounted connectors in a lateral wall thereof into which the storage battery may be easily inserted. The side-mounted connectors are coupled to a conventional AC trickle charger for maintaining the battery in a fully charged state. After charging, the battery may be easily removed therefrom and re-installed in the vehicle from which it was removed. The present invention thus not only facilitates the installation and removal of a storage battery from a vehicle, but also provides for maintaining the storage battery in a fully charged state without complex connections, detailed installations, or expensive components.

BRIEF DESCRIPTION OF THE DRAWINGS

The appended claims set forth those novel features believed characteristic of the invention. However, the invention itself, as well as further objects and advantages thereof will best be understood by reference to the following detailed description of a preferred embodiment taken in conjunction with the accompanying drawings, where like reference characters identify like elements throughout the various figures, in which:

FIG. 1 is an exploded perspective view of the battery installation portion of the present invention for a battery with side-mounted terminals;

FIG. 2 is a partially cut away vertical sectional view taken along the line 2—2 of FIG. 1 showing in greater detail the configuration of the battery case and the terminal clamps;

FIG. 3 is a partially cut away perspective view of a terminal clamp and a vehicle lead and contact combination in accordance with the present invention;

FIG. 4 is a perspective view of the battery charging portion of the quick disconnect battery installation and charging system of the present invention.

DESCRIPTION OF THE PREFERRED EMBODIMENTS

Figure 5:
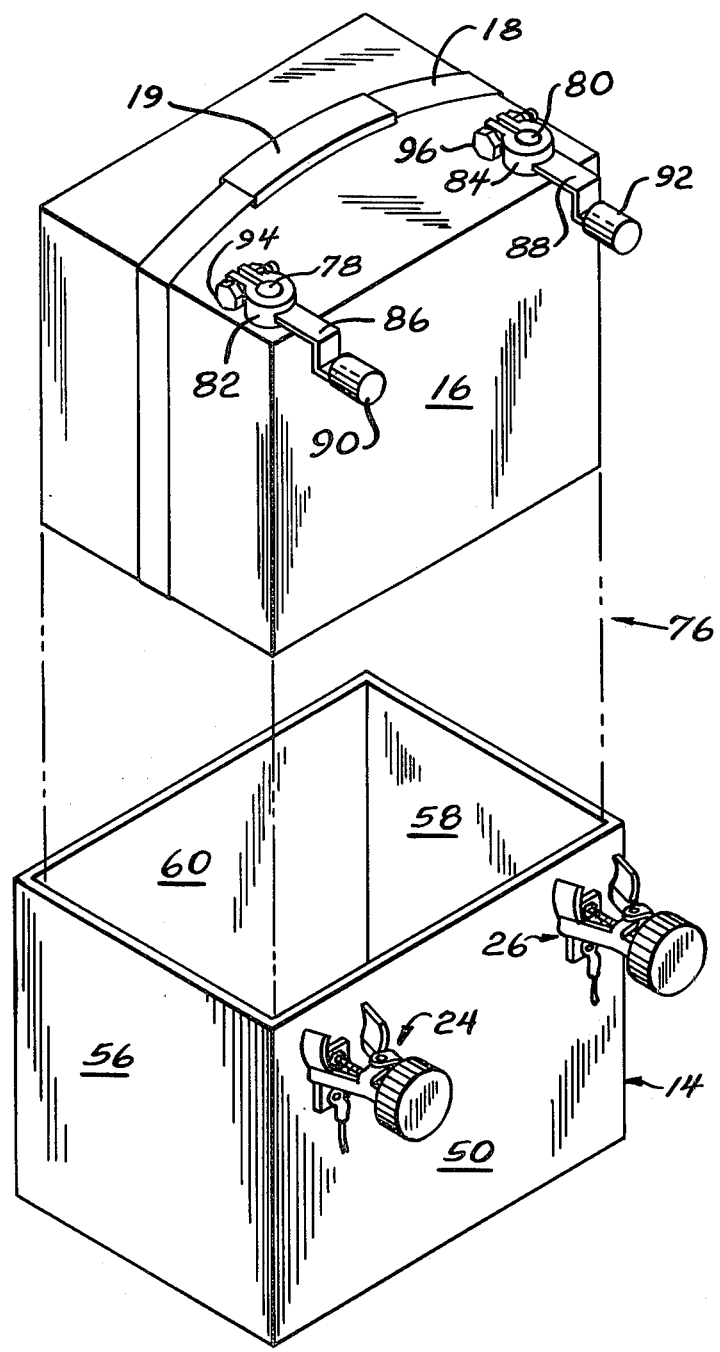
FIG. 5 is an exploded perspective view of the battery installation portion of the present invention for a battery having top-mounted, post-like terminals.

Referring to FIG. 1, there is shown an exploded perspective view of the battery installation portion 10 of a quick disconnect battery installation and charging system in accordance with the present invention for a storage battery with side-mounted terminals.

The battery installation portion of the system includes a battery installation case 14 having a front wall 50, a rear wall 60, lateral walls 56, 58 and a lower element (not shown) forming the base thereof. The battery installation cae 14 thus forms an enclosure open at the top portion thereof and into which a conventional storage battery 16, such as of the lead-acid type, may be positioned. The mounting of the installation case 14 in the vehicle in which the battery is to be installed, such as an automobile or a boat, may be conventional in nature and does not form a part of the present invention.

The battery 16 is provided with a strap 18 on which is positioned a handle 19 for facilitating the positioning of the battery within the installation case and its removal therefrom. As shown in FIG. 1, the battery includes positive and negative terminals on a lateral portion thereof and into which positive and negative battery terminal contacts 20, 21, respectively, may be threadably coupled. Each battery terminal contact 20, 21 for the side-mounted battery terminal includes a threaded portion proximally positioned with respect to the battery and a cyindrical-shaped contact portion distally positioned with respect to the battery. The threaded portion of a battery terminal contact engages threads in a lateral wall of the battery 16. These threads form an integral part of a respective battery terminal and electrical contact is established between a terminal contact and a respective battery terminal by the aforementioned threaded engagement therebetween.

As shown in FIG. 1, and in greater detail in FIG. 2 which is taken along line 2—2 of FIG. 1, the front wall 50 of the battery installation case 14 includes two apertures formed in the upper edge thereof for receiving a respective terminal contact when the battery is lowered into and positioned within the installation case 14. Positioned immediately adjacent a respective aperture in the upper edge portion of the front wall 50 of the battery case are positive and negative terminal clamps 26, 24. Each terminal clamp is adapted to securely engage a terminal cntact when positioned within an aforementioned aperture in an upper edge of the front wall of the battery installation case 14. Each terminal clamp may be manually adjusted to securely engage a corresponding terminal contact and is electrically connected to a respective vehicle electrical lead so as to electrically couple the battery into the vehicle's electrical system. Finally, each terminal clamp is securely mounted to the front wall 50 of the battery installation case 14 so that when the battery terminal contacts are engaged by the terminal clamps, the battery is securely and stably positioned within the battery installation case 14 and not susceptible to displacement caused by vehicle movement.

Referring to FIG. 3, there is shown a partially cut away perspective view of the positive terminal clamp 26 shown in FIG. 1. The following description of the structure and operation of the positive terminal clamp 26 is equally applicable to the negative terminal clamp 24, since these elements are form, fit, and functionally interchangeable. In describing the terminal clamp 24, the terms proximal and distal are used with reference to the battery installation case on which the terminal clamp is mounted. The terminal clamp 24 includes a rotatable knob 38 having a threaded bore 69 positioned along the axis thereof. Threadably engaged within the center bore 69 of rotatable knob 38 is a screw 70, the proximal portion of which is inserted through an aperture in the front wall 50 of the battery installation case 14. The screw 70 is then securely mounted on the front wall 50 by means of nuts 72. In this manner the terminal clamps 24, 26 are securely mounted on the front wall 50 of the battery installation case 14.

Each terminal clamp 24, 26 further includes engaging arms 28, 30 which are pivotally coupled by means of connecting pin 73. The engaging arms 28, 30 are free to rotate about connecting pin 73 and are biased by means of a biasing spring 71 such that the proximal ends of the engaging arms are displaced from one another while the distal portions thereof are biased toward one another by means of spring 71. Each terminal clamp further includes a coupling 74 through which the connecting pin 73 and the screw 70 are inserted for maintaining the relative configuration of these various components.

The distal ends of the engaging arms 28, 30 which are biased together by means of spring 71 include an outwardly flared configuration which cooperates with a circular engaging surface 68 on an inner portion of rotatable knob 38 for adjusting the displacement between the proximal ends of the engaging arms 28, 30. The circular engaging surface 68 of the rotatable knob 38 is concentrically positioned along the axis of the threaded bore 69 therein and includes a wedge-shaped surface for controlling the displacement between the distal end portions of the engaging arms 28, 30. By thus adjusting the distal portions of the engaging arms, which are pivotally coupled by means of connecting pin 73, the proximal portions of the engaging arms may be either separated or adjusted to tightly engage a respective terminal contact.

The terminal clamps are adjusted in the following manner. By rotating knob 38 in a clockwise direction, it is displaced along the threaded screw 70 toward the battery installation case. The wedging effect of the circular engaging surface 68 of knob 38 forces the distal portions of the engaging arms 28, 30 apart which, in turn, causes the proximal portions thereof to be displaced toward one another so as to engage a terminal contact positioned therebetween. The displacement of the aforementioned portions of the engaging arms are shown by the direction of the arrows in FIG. 3. With spring 71 biasing the proximal portions of the engaging arms 28, 30 apart, the counter-clockwise rotation of knob 38 along threaded screw 70 will cause it to be displaced away from the battery case allowing the distal portions of the engaging arms 28, 30 to be displaced toward one another and the separation between the proximal portions thereof to be increased. This permits a battery terminal contact positioned within and engaged by a respective terminal clamp to be removed therefrom and facilitates the removal of the battery from the battery installation case 14.

A mounting/conducting plate 38 is positioned on the outer surface of the front wall 50 of the battery installation case and between each terminal clamp and the front wall portion immediately adjacent thereto. The mounting/conducting plate 36 includes an upper and lower aperture (not shown) through which screw 70 and a bolt 79 are inserted. The mounting/conducting plate 36 is then maintained securely in position by means of nuts 72 coupled to screw 70 and a nut 75 to the lower bolt 79. A lug 77 is positioned on or immediately adjacent to bolt 79 so as to be in electrical contact with the mounting/conducting plate 36 by means of nut 75. Lug 77 is coupled to the vehicle's positive lead 32. Mounting/conducting plate 36 thus provides an electrical path between the terminal clamp 24, which is electrically connected to the positive terminal contact 20, and the positive lead of the vehicle 32. The configuration and operation of the negative terminal clamp 26 is identical to that of the positive terminal clamp 24 and will not be described herein. The terms screw and bolt as used in the preceding description are intended to be used interchangeably.

As shown in FIG. 2, one of the terminal clamps may be positioned within a slot 52 in the front wall 50 of the battery installation case. By loosening mounting nut 72 on the threaded screw 70, the terminal clamp 26 may be selectively positioned along slot 52 to permit the present invention to accommodate a range of side-mounted battery inter-terminal distances. While FIG. 2 shows the variable positioning of only one of the terminal clamps, a second slot may be similarly incorporated in the installation case's front wall 50 immediately adjacent terminal clamp 24 to provide additional flexibility in accommodating various inter-terminal spacings for a storage battery with side-mounted terminals.

Each terminal clamp is comprised of conducting, metallic material with the exception of the rotatable knob which is preferably comprised of an insulating material, such as plastic. The general configuration and operation of the terminal clamps described above is well known in the art as such electrical clamps of the general configuration described above are commonly used in industrial fuse boxes. The general configuration of such electrical clamps has been particularly adapted for application in the present invention as previously described.

Referring to FIG. 4, there is shown the battery charging portion 12 of the present invention. The battery charging portion 12 of the system includes a battery charging case 15 which is of the general configuration of the battery installation case 14 previously described. Thus, the battery charging case 15 includes a front wall 61, a rear wall 66, lateral walls 62, 64 and a lower, base element (not shown). A battery 16 may be positioned within charging case 15 by lowering it into the opening defined by its front, lateral, and rear walls, as shown in FIG. 4. As in the battery installation portion of the present invention previously described, the battery charging case 15 includes a pair of apertures on the upper edge portion of the front wall 61 thereof. Positioned immediately adjacent each of the aforementioned apertures and securely mounted to the front wall 61 of the battery charging case are battery charger positive and negative terminal clamps 26, 24. These terminal clamps are identical to those previously described with respect to the battery installation case, as is the manner in which they are securely mounted to the battery charging case 15.

The battery charger positive and negative terminal clamps 26, 24 are respectively coupled to the positive and negative leads 40, 42 by means of respective mounting/conducting plates and lugs as previously described with respect to the battery installation portion of the present invention. As shown in FIG. 4, the positive terminal clamp 26 may be variably positioned along the length of the front wall 61 of the charging case by means of a horizontal slot 54 therein. The positive and negative leads 42, 40 are coupled to a conventional trickle charging unit 44 which is, in turn, connected to a conventional AC outlet (not shown) by means of an AC cord 46 and plug 48 combination. The trickle charging unit 44 contemplated for use in the present invention is of conventional design and generally includes a rectifying circuit for converting the AC input voltage to a DC output and a voltage regulating circuit for providing a predetermined and well-regulated DC voltage for charging a battery positioned within the charging case 15.

Referring to FIG. 5, there is shown a second embodiment of the present invention particularly adapted for use with a battery having top-mounted, post-like positive and negative terminals 80, 78. Mounted in a conventional manner to the respective positive and negative terminal posts 80, 78 are positive and negative post clamps 84, 82. These post clamps include a generally circular aperture therein in which a respective terminal post is inserted with firm physical engagement and electrical contact established by tightening the post clamp around the post terminal by means of the nut and bolt combinations 94, 96 as shown in FIG. 5. Electrically coupled to a respective terminal/clamp combination are positive and negative leads 88, 86. To the distal portions of positive and negative leads 88, 86 are respectively coupled positive and negative contacts 92, 90. Electrical contact between the ends of the positive and negative leads 88, 86 and a respective post clamp and contact may be accomplished by incorporating appropriately sized slots in a respective post clamp and contact, and inserting the respective ends of a lead therein, and soldering the end therein in establishing firm physical coupling and good electrical contact therebetween. As shown in FIG. 5, the positive and negative leads 88, 86 are formed so as to extend above and beyond the front wall 50 of the battery case 14 and thence downward so as to permit the positive and negative contacts 92, 90 to be firmly engaged by respective terminal clamps 26, 24. The mounting and operation of the terminal clamps 26, 24 shown in FIG. 5 with respect to the battery installation for top-mounted terminals 78, 76 is similar to that previously described with respect to the side-mounted battery terminal installation.

The battery installation case 14 shown in FIG. 5 is similar in configuration and operation to that previously described with respect to FIG. 1. Similarly, although the battery installation case is shown in FIG. 5, the present description of the operation and configuration of the battery installation for a battery with top-mounted terminals 78, 80 is equally applicable for the battery charging portion of the invention.

There has thus been shown a quick disconnect battery installation and charging system which facilitates the installation of a battery in and its removal from a vehicle and its subsequent charging. The present invention is compatible with most existing conventional battery installations such as the side-mounted and top mounted terminal configurations and does not require extensive modifications to existing vehicle installations, expensive components, or an intricate battery installation and removal procedure.

While particular embodiments of the invention have been shown and described, it will be obvious to those skilled in the art that changes and modifications may be made thereto without departing from the invention and its broader aspects. The aim in the appended claims, therefore, is to cover all such changes as fall within the true spirit and scope of the invention. The matter set forth in the foregoing description and accompanying drawings is offered by way of illustration only and not as a limitation. The actual scope of the invention is intended to be defined in the following claims when viewed in their proper perspective against the prior art.

We claim:

1. In a vehicle having positive and negative electrical leads, means for facilitating the installation therein, removal therefrom, and charging of a storage battery having threaded positive and negative electrical terminals on a lateral portion thereof, said means comprising:

a first housing rigidly mounted to said vehicle and having an open upper portion for receiving said storage battery and including a bottom panel and a plurality of lateral walls for securely engaging said storage battery in tight-fitting relation;

first and second threaded conductive pins securely engaging and electrically coupled to respective electrical terminals of said storage battery and extending outward from said lateral portion thereof; and first and second engaging electrical clamp means coupled to respective positive and negative leads of said vehicle and secured to an upper edge portion of a lateral wall of said first housing for securely engaging respective first and second conductive pins when said storage battery is positioned in said first housing in electrically coupling said vehicle to said storage battery.

2. The combination of claim 1 wherein at least one of said first and second engaging electrical clamp means is variably positioned along the lateral wall of said first said housing to accommodate various inter-terminal distances in a storage battery.

3. The combination of claim 1 wherein said first and second engaging electrical clamp means include a pair of movable electrically conductive elements having an opening therebetween on an upper portion thereof for receiving a respective conductive pin.

4. The combination of claim 1 wherein said first housing is comprised of molded plastic with the lateral walls thereof in tight-fitting relation with the lateral periphery of said storage battery for the stable positioning of said storage battery therein.

5. The combination of claim 1 wherein said storage battery includes a strap firmly coupled thereto for facilitating the installation in and removal of said battery from said first housing.

6. The combination of claim 1 further including:

a second housing having an open upper portion for receiving said storage battery and including a bottom panel and a plurality of lateral walls for retaining said storage battery;

third and fourth engaging electrical clamp means secured to an upper edge portion of a lateral wall of said second housing for securely engaging respective first and second conductive pins when said storage battery is removed from said vehicle and placed therein; and charging means coupled to said third and fourth engaging electrical clamp means for maintaining said storage battery in a charged condition when placed in said second housing.

7. The combination of claim 6 wherein at least one of said third and fourth engaging electrical clamp means is variably positioned along the lateral wall of said second housing to accommodate various inter-terminal distances in a storage battery.

8. In a vehicle having positive and negative electrical leads, means for facilitating the installation therein, removal therefrom, and charging of a storage battery having post-type positive and negative electrical terminals mounted to an upper panel thereof, said means comprising:

a first housing rigidly mounted to said vehicle and having an open upper portion for receiving said storage battery and including a bottom panel and a plurality of lateral walls for securely engaging said storage battery in tight-fitting relation;

first and second engaging electrical clamp means coupled to respective positive and negative leads of said vehicle and secured to an upper edge portion of a lateral wall of said first housing; and first and second electrical conductors adapted at a first end thereof to securely engage a respective post-type electrical terminal on said storage battery and at a second end thereof to releasably engage said engaging electrical clamp means on said first housing.

9. The combination of claim 8 wherein said first and second engaging electrical clamp means include a pair of movable electrically conductive elements having an opening therebetween on an upper portion thereof for receiving a respective conductive pin.

10. The combination of claim 8 wherein said first housing is comprised of molded plastic with the lateral walls thereof in tight-fitting relation with the lateral periphery of said storage battery for the stable positioning of said storage battery therein.

11. The combination of claim 8 wherein said storage battery includes a strap firmly coupled thereto for facilitating the installation and removal of said battery.

12. The combination of claim 8 wherein said first and second electrical conductors are comprised of a rigid metallic material formed into a flat, thin strip adapted to extend beyond the upper panel of said storage battery and downward along a lateral wall thereof so as to position said second end thereof in close proximity to a respective electrical clamp means when said storage battery is positioned within said first housing.

13. The combination of claim 8 wherein the second end portions of said first and second electrical conductors are cylindrical in shape and adapted to be securely engaged by a respective electrical clamp means.

14. The combination of claim 8 further including:
a second housing having an open upper portion for receiving said storage battery and including a bottom panel and a plurality of lateral walls for retaining said storage battery;
third and fourth engaging electrical clamp means secured to an upper edge portion of a lateral wall of said second housing for securely engaging respective first and second conductive pins when said storage battery is removed from said vehicle and placed therein; and
charging means coupled to said third and fourth engaging electrical clamp means for maintaining said storage battery in a charged condition when placed in said second housing.

15. The combination of claim 14 wherein said third and fourth engaging electrical clamp means each include a pair of movable electrically conductive elements having an opening therebetween on an upper portion thereof for receiving a respective conductive pin.

* * * * *